(12) United States Patent
Camp et al.

(10) Patent No.: US 8,769,111 B2
(45) Date of Patent: Jul. 1, 2014

(54) IP NETWORK SERVICE REDIRECTOR DEVICE AND METHOD

(75) Inventors: Michael Camp, Mission Viejo, CA (US); Stephen P. Emmons, Carrollton, TX (US); Jeffrey O. Smith, Dallas, TX (US)

(73) Assignee: Numerex Corp., Atlanta, GA (US)

( * ) Notice: Subject to any disclaimer, the term of this patent is extended or adjusted under 35 U.S.C. 154(b) by 0 days.

(21) Appl. No.: 13/209,536

(22) Filed: Aug. 15, 2011

(65) Prior Publication Data

US 2012/0203926 A1 Aug. 9, 2012

Related U.S. Application Data

(60) Provisional application No. 61/373,988, filed on Aug. 16, 2010.

(51) Int. Cl.
*G06F 15/16* (2006.01)
*G06F 15/173* (2006.01)

(52) U.S. Cl.
USPC .......................................... 709/227; 709/224

(58) Field of Classification Search
USPC ........................................................ 709/238
See application file for complete search history.

(56) References Cited

U.S. PATENT DOCUMENTS

| | | | |
|---|---|---|---|
| 6,230,012 B1 * | 5/2001 | Willkie et al. | 455/435.1 |
| 6,687,732 B1 * | 2/2004 | Bector et al. | 709/200 |
| 7,107,347 B1 * | 9/2006 | Cohen | 709/229 |
| 7,161,947 B1 * | 1/2007 | Desai | 370/401 |
| 2003/0229809 A1 * | 12/2003 | Wexler et al. | 713/201 |
| 2004/0243703 A1 * | 12/2004 | Demmer et al. | 709/224 |
| 2005/0010653 A1 * | 1/2005 | McCanne | 709/219 |
| 2006/0117095 A1 * | 6/2006 | Barghouthi et al. | 709/219 |
| 2006/0195895 A1 * | 8/2006 | Ben-Shachar et al. | 726/11 |
| 2008/0077707 A1 * | 3/2008 | Ferguson et al. | 709/238 |
| 2008/0130637 A1 * | 6/2008 | Kant et al. | 370/389 |
| 2008/0320154 A1 * | 12/2008 | Demmer et al. | 709/229 |
| 2010/0115105 A1 * | 5/2010 | Christie, IV | 709/227 |
| 2012/0042060 A1 * | 2/2012 | Jackowski et al. | 709/224 |
| 2012/0203825 A1 * | 8/2012 | Choudhary et al. | 709/203 |

FOREIGN PATENT DOCUMENTS

| | | | |
|---|---|---|---|
| WO | WO 02/35795 A1 | 5/2002 | |
| WO | WO 2009/005650 A2 | 1/2009 | |

* cited by examiner

*Primary Examiner* — Gerald Smarth
(74) *Attorney, Agent, or Firm* — Bell Nunnally & Martin LLP; Craig J. Cox

(57) ABSTRACT

A method for redirecting specific network traffic intended for a target device on a first data network is described. The method inserts a redirector into a first network in front of a target device and intercepting a transmission from the target device. The method then configures the network characteristics of the redirector to use the network addresses of the target device. Once configured the redirector inspects the network traffic on the first network to identify specific services, and sends the network traffic associated with the specific service to a destination device on a second network.

4 Claims, 4 Drawing Sheets

IP NETWORK SERVICE REDIRECTOR DEVICE AND METHOD

CROSS REFERENCE TO RELATED INFORMATION

This application claims the benefit of U.S. Provisional Patent Application No. 61/373,988, filed Aug. 16, 2010, titled "IP Network Service Redirector Device and Method" the entire contents of which are hereby incorporated by reference.

TECHNICAL FIELD

The present disclosure is directed to data and telecom network equipment, and particularly to a redirector in a network that intercepts specific traffic from a target device and redirects that traffic onto a different network.

BACKGROUND OF THE INVENTION

There often arises the need or desire to identify a particular type of network traffic to or from a target device and to redirect only that specific type of traffic allowing all other traffic to flow normally. Such a need or desire can occur with regard to control or administrative traffic or with respect to a particular type of service. Prior approaches for creating this type of redirector require LAN administration personnel to configure the address of the redirector, reconfigure the addresses of devices on the existing LAN segments, and/or reconfigure routing tables or destination addressing for devices on the existing LAN segments. Prior approaches also require the inserted redirector to discover and maintain a routing or bridging table for the existing LAN.

What is needed is a device that is inserted into an existing Ethernet IP LAN so a specific set of services for a specific device on the LAN can be rerouted to another network without either segment of the LAN being aware of the intervention. The target service(s) alone need to be rerouted, while all other IP traffic on the LAN needs to occur just as it would were the device not present. The rerouting needs to occur without either segment of the LAN having to have their addressing reconfigured, and without the device being "visible" on the network. This would allow the device to be installed into the LAN without requiring any LAN administration.

BRIEF SUMMARY OF THE INVENTION

In a particular embodiment, a method for redirecting specific network traffic intended for or sent from a target device on a first network is described. The method includes inserting a redirector into a first network in front of a target device and intercepting a transmission from the target device. The redirector configures the network characteristics of the redirector to use the network addresses of the target device and inspects the network traffic on the first network to identify specific services. When network traffic comprising the specific services is identified, the redirector sends the network traffic associated with the specific service to a destination device on a second network.

In another embodiment, a network redirector for redirecting specific network traffic to or from a target device is described. The redirector includes a first network interface with a first network, and a third interface with a target device. The redirector also includes a microprocessor programmed to intercept a transmission from the target device and configure network characteristics of the redirector to use a network addresses of the target device. The redirector inspects the network traffic on the first network to identify specific services, and sends the network traffic associated with the specific service to a destination device on the second network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
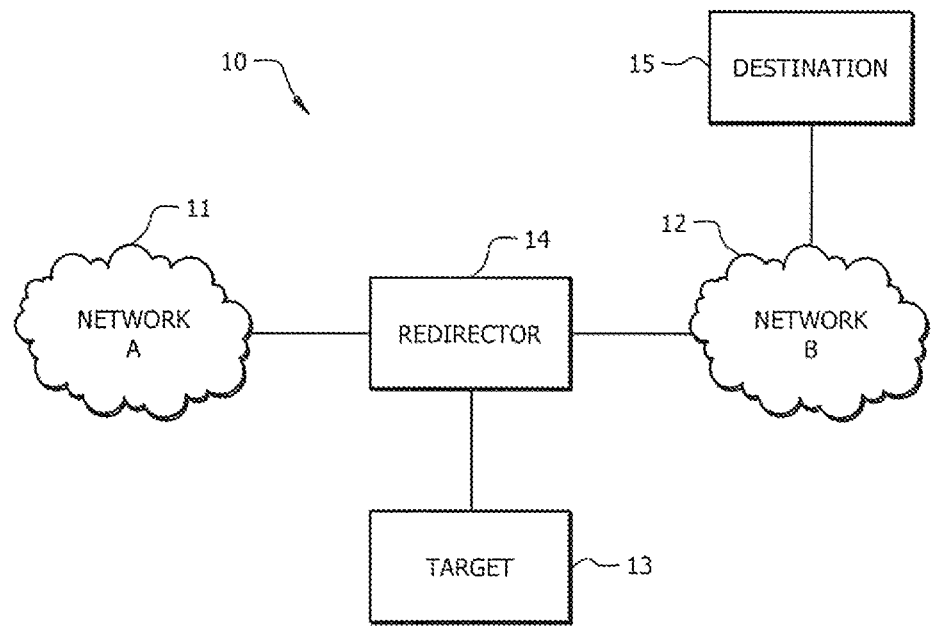
FIG. 1 is a simplified network diagram showing an embodiment of a redirector according to the concepts described herein.

Referring now to FIG. 1, a simplified network diagram illustrating the operation of an embodiment of a redirector according to the concepts described herein is shown. Network 10 includes network A 11 and target device 13. Target device 13 is normally connected directly to network A 11 using standard connections such as Ethernet, 802.11 wireless protocols, cellular, or any other similar network connection. In certain instances, there may be particular types of network traffic or services that the owner of target device 13 would like to redirect without affecting the normal operation of target device 13 and network A 11.

The redirector device 14 described by the concepts herein, and referred to as a redirector, is inserted into the existing network A 11, which can, for example, be an existing Ethernet IP LAN, immediately in front of the target device 13 for which services or types of traffic are to be redirected. The target device 13 is the only network connected device on the network segment of network A 11 between the redirector 14 and the target device 13. In addition to the connection to network A 11, redirector is also connected to network B 12. Network B 12 can be any other type of network including a LAN, wireless or cellular network, or network B 12 could be separated from network A 11 by a firewall or other security measure.

Once inserted into network A 11, redirector 14 passes through all IP packets between network A 11 and the target device 13 without modification or interruption, with the exception of those services or traffic types which are to be redirected. While passing through IP packets, redirector 14 also inspects all packets to determine if those packets are of the type or the services to be redirected. Those packets are identified by inspecting the higher level information in packets beyond merely the source and destination addresses. The information inspected can be the higher level protocol (e.g., UDP, TCP, ARP, etc.), the port(s) being used by the sending node, or any other information in the packet that identifies the application or service represented in the payload of the packet.

When redirector 14 identifies IP packets of the services or type to be redirected, it does not pass them through. If it receives these IP packets from the target device, then the redirector routes them to a destination device 15 onto a second, independent IP-based network. This network could be another Ethernet, a wireless LAN, or a cellular service. The redirector may perform a destination IP address translation and/or a source IP address translation for the rerouted packets. Responses to the rerouted packets from the destination device on the rerouted network are themselves routed to the target device. The redirector may perform a destination IP address translation and/or a source IP address translation for the response packets.

If the redirector receives IP packets of the services being redirected from, or is attempting to send to, network A 11, then redirector 14 either discards those packets, reroutes them onto reroute network B 12 (potentially also performing IP address translations), or forwards them to the target device 13.

According to the concepts described herein, redirector 14 may be inserted into the network without requiring any changes to the network structure or routing tables, or to the target device itself. As will be described below with reference to FIG. 4, the redirector is configured upon its insertion in the network to look just like the target device to the network itself. This is accomplished by giving the redirector the network address of the target device. Once connected and activated (powered on), the redirector uses a MAC address of all zeros (i.e., 00:00:00:00) on the network port connected to the target device. Redirector 14 intercepts the first IP transmission sent by target device 13. Redirector 14 then configures its network communications port to network A 11 to use the MAC address and the IP address of target device 13. Redirector 14 also reconfigures its network port connected to target device 13 to use the MAC address of the target device, but with the "Locally-Administered Address" bit set on.

The advantage of the concepts described herein is that it allows redirector device 14 to be physically inserted into network A 11, which can, for example, be an Ethernet LAN, upstream of a target device 13 without requiring any configuration changes to network A 11 or target device 13, and to redirect just a defined set of IP services or traffic types onto another network. The presence or operation of the redirector device is not visible to or detectable by either network A 11 (and its nodes) or target device 13. All other IP communications, other than the redirected services, will occur as normal as if the redirector device were not present. Target device 13 will communicate the subject services with nodes on redirected network B 12 with full functionality, but without being aware that those nodes are not on the original network A 11

Figure 2:
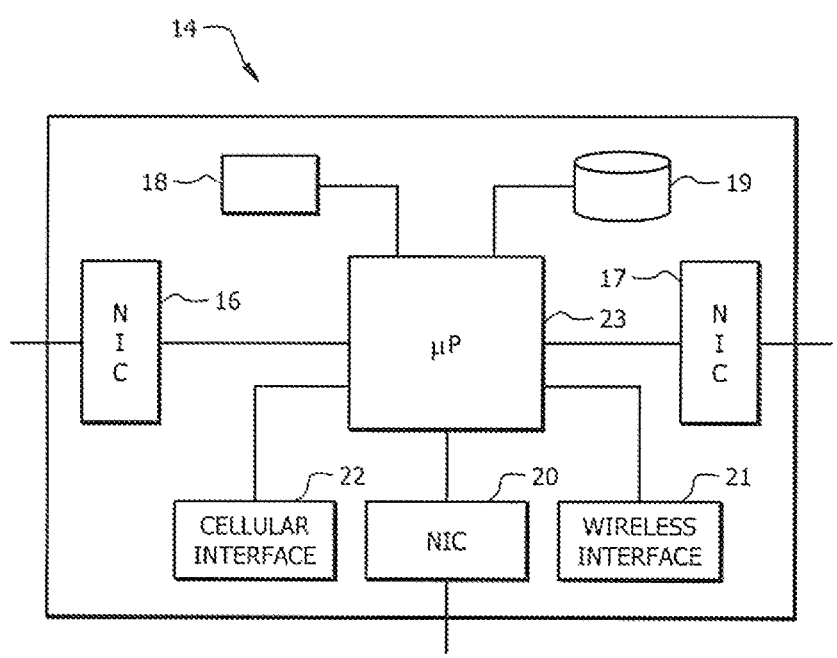
FIG. 2 is a simplified block diagram showing an embodiment of the redirector of FIG. 1.

Referring now to FIG. 2, an embodiment of a redirector according to the concepts described herein is shown. Redirector 14 is formed primarily by a microprocessor 23, internal memory 18 and network interfaces. A mass storage device 19 may or may not be included as required. Network interfaces between the original network, such as network A 11 from FIG. 1, redirect network, such as network B 12, and target device can be of any known or future developed network interface. These include wired network interfaces such as an Ethernet connection using a network interface card, such as NIC 16, 17 or 20, or could be a wireless interface, such as any of the 802.11 wireless protocols, or a short range wireless interface such as Bluetooth, which use wireless interface 21. The network connection could also be a cellular connection such as SMS, 3G, 4G, LTE or other cellular protocol, using cellular radio interface 22. Any type of network connections may be used while remaining within the scope of the concepts described herein.

As described above, redirector 13 monitors traffic received on either of the network interfaces connected to the target device or the original network. Programming for the redirector 14 is stored in memory internal to microprocessor 23, or in internal memory 18 or mass storage device 19. Microprocessor 23 monitors the network traffic and when it recognizes a particular service or type of network traffic, redirector 14 takes that network traffic and either discards it, duplicates it onto the network interface for the redirect network while passing it normally through the other network interfaces or completely redirects the traffic onto the redirect network, preventing the packets from continuing in their intended path.

Figure 3:
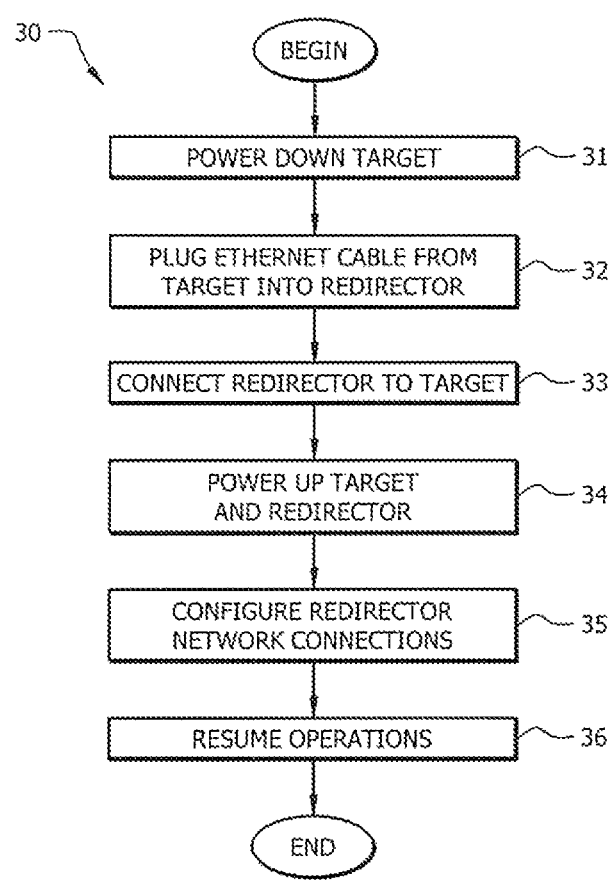
FIG. 3 is a flow chart showing an embodiment of an installation process according to the concepts described herein for inserting the redirector into a network.

Referring now to FIG. 3, a flow chart showing an embodiment of an installation process for the redirector is described. Process 30 begins with the powering down of the target device, as shown by block 31. Once the target device is powered down, the process continues by taking the network connection from the target device and plugging it into the redirector device, thereby connecting the redirector device to the original network, as shown in block 32. Next, as shown by block 33, the redirector is connected to the target device. After all the connections have been made, the process continues to block 34 where the target device and the redirector device are powered up. Block 35 shows the redirector network settings being configured as will be described in greater detail with respect to FIG. 4. After the network connections have been configured for the redirector device, the process resumes normal operation as shown in block 36.

Figure 4:
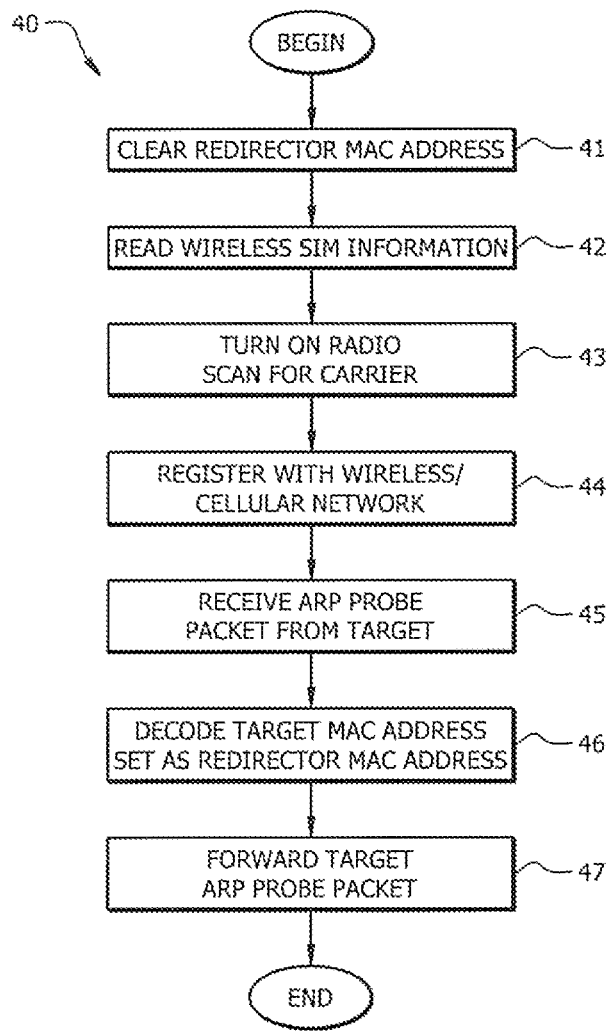
FIG. 4 is a flow chart showing an embodiment of a configuration process according to the concepts described herein for configuring the redirector.

Referring now to FIG. 4, an embodiment of a process for configuring the network settings of the redirector device is described. Process 40 is directed toward the case where the redirect network is a cellular network, however, those skilled in the art will recognize that the process can be used where the networks involved are any type of IP networks with only minor modifications to process 40.

Process 40 begins in block 41 where the MAC address of the redirector is cleared and reset with all zeros, as described above. Next, as shown in block 42, the redirector reads the SIM information programmed into the redirector or a cellular SIM card installed in the redirector. The process then passes to block 43 where the cellular radio is turned on and scans for a carrier, where multiple carriers are available, the redirector is programmed to select a preferred carrier. The redirector then registers with the network allowing the redirector to send and receive traffic over the network, as shown in block 44.

Before, after, or simultaneously with the configuration of the redirector network, the redirector monitors the connection to the target device for a packet sent from the target device, such as an ARP probe packet, as shown in block 45. In block 46, the redirector decodes the MAC address of the target device from the received packet and sets its own MAC address on its connection to the original network to the address of the target device. The redirector then forwards the packet onto the original network as if it were the target device, as shown by block 47. The redirector also reconfigures its network port connected to target device 13 to use the MAC address of the target device, but with the "Locally-Administered Address" bit set on.

Figure 5:
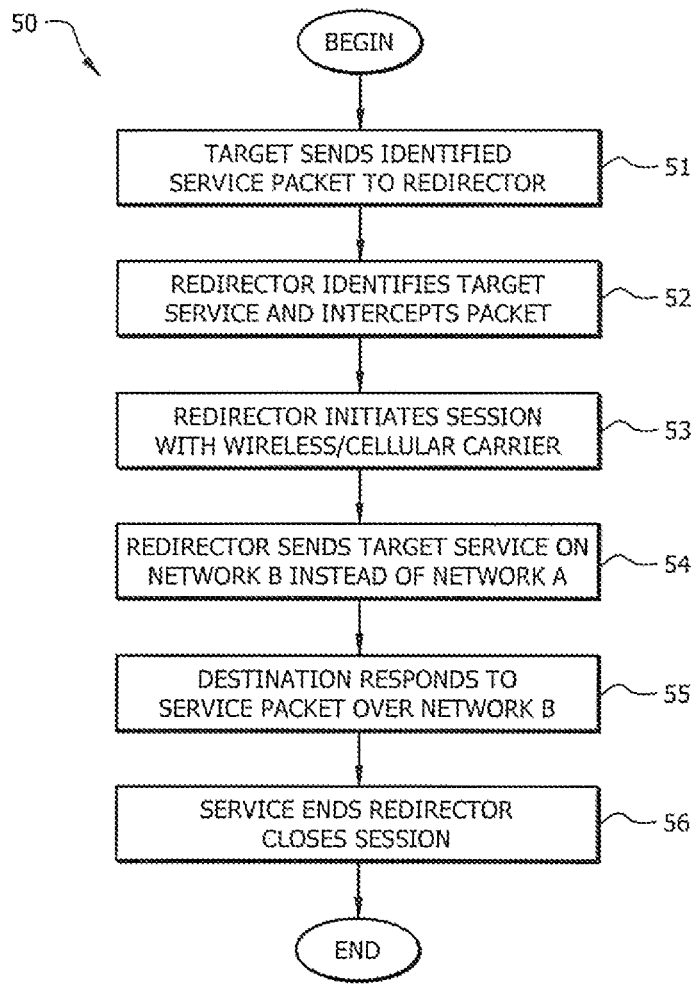
FIG. 5 is a flow chart showing an embodiment of an operation process according to the concepts described herein for the operation of the redirector.

Referring now to FIG. 5, an embodiment of a process showing an example of the operation of the redirector is described. Process 50 begins in block 51 where the target sends a network traffic comprised of the service or type of traffic that the redirector is programmed to intercept. All other network traffic is passed normally by the redirector as described above. In block 52, the redirector identifies the traffic as being of the particular service or traffic type and intercepts the packet. The redirector then initiates a session with the redirector network, as shown in block 53, and sends the network traffic of the target service or traffic type to the redirect network, as shown in block 54. While process 50 describes a redirect of the traffic, the traffic can also be duplicated onto both networks or discarded altogether. If appropriate, the destination device on the redirect network can respond to the redirected traffic, shown by block 55. After the network traffic comprising the target service or type has ended, the redirector can end the session over the redirect network, as shown by block 56 and return to normal operation.

To further illustrate the operation of the redirector, the following use-cases describe the operation and applications of a redirector according to the concepts described herein. While the use-cases describe a particular type of target device, namely a printer, and particular network types for the various connections, any target device or network type is well within the scope of the concepts described herein.

Installer Use Case
1. If the printer is not already powered down, the installer powers down the printer.
2. The installer disconnects the Ethernet cable from the printer and plugs it into the Ethernet RJ-45 port on the appliance. This is the LAN Ethernet.
3. The installer plugs the Ethernet cable from the appliance into the now open Ethernet port on the printer.
4. The installer plugs the power cable from the appliance into a power receptacle.
5. The installer observes that the "Wireless Connection" LED on the appliance begins to flash green, indicating that the appliance is powered.
6. The installer observes that the "Wireless Connection" LED on the appliance turns continuously green, indicating that the appliance has established a connection with the cellular network.
7. The installer turns power back on to the printer.
8. The installer observes that the "Ethernet Connection" LED on the appliance turns continuously green, indicating that the appliance has completed its configuration on the local area network.
9. Installation is complete.

Appliance Initialization Use Case
1. The installer completes step 4 from the Installer Use Case.
2. The appliance begins flashing the "Wireless Connection" LED (alternatively, does this after a successful POST)—enabling step 5 from the Installer Use Case.
3. The appliance conducts a power-on self-test (POST).
4. The appliance clears its stored MAC address, as represented to the printer over the Ethernet connection to the printer, and sets it to be all zeros.
5. The appliance reads its wireless configuration information from the SIM and activates the radio.
6. The appliance scans the cellular frequencies and identifies the most preferred available carrier network.
7. The appliance requests to register on the cellular network.
8. The cellular network authorizes the appliance to operate on the cellular network.
9. The appliance changes the "Wireless Connection" LED to continuously on—enabling step 6 from the Installer Use Case.
10. The installer completes step 7 from the Installer Use Case.
11. The printer sends an ARP probe over its Ethernet connection to verify that its IP address is unique.
12. The appliance receives the ARP probe. The appliance decodes the printer MAC and IP addresses from the printer and stores them in memory.
13. The appliance sets the MAC address of the port connected to the LAN to use the printer's exact MAC address. The appliance sets the IP address of the port connected to the LAN to use the printer's exact IP address.
14. The appliance sets the MAC address of the port connected to the printer to use the printer's MAC address, but with the "Locally-Administered Address" bit set.
15. The appliance sends the printer's ARP probe onto the LAN. No response is received, indicating that the printer's IP address is unique on the LAN.
16. The appliance turns the "Ethernet Connection" LED on continuously—enabling step 8 from the Installer Use Case.

Standard Printing Use Case
1. A print request is sent over the LAN to the printer.
2. The appliance receives the print request over its LAN connection.
3. The appliance inspects the print request and identifies that it is not a UDP transmission on port 161.
4. The appliance sends the unmodified print request to the printer over its Ethernet connection to the printer.
5. The printer receives the print request and executes it. Any responses, status messages or error messages are sent by the printer over its Ethernet connection to the appliance.
6. The appliance inspects the messages from the printer and identifies that they are not UDP transmissions on port 161.
7. The appliance sends the unmodified messages from the printer over its LAN connection using the MAC address and IP address of the printer.

Printer SNMP Reporting Use Case
1. The printer sends an SNMP message over its Ethernet connection to the appliance (directed to the IP address of the destination Xerox SNMP Server that has been previously configured on the printer).
2. The appliance receives the SNMP message over its Ethernet connection to the printer.
3. The appliance inspects the SNMP message and identifies that it is a UDP transmission on port 161.

4. The appliance initiates a PPP/GPRS session with the carrier APN. The carrier assigns a carrier dynamic IP address to the appliance for the session.
5. The appliance transmits the SNMP message over the PPP/GPRS session, using the destination IP address of the Xerox SNMP Server and its source IP address assigned by the carrier.
6. The carrier APN receives the SNMP message from the appliance.
7. The carrier APN resends the unmodified SNMP message to the Xerox SNMP Server over the public Internet using the Xerox SNMP Server's IP address as the destination address and the appliance's dynamically assigned IP address as the source address.
8. The Xerox SNMP Server receives the SNMP message from the printer.
9. The Xerox SNMP Server responds to or acknowledges the SNMP message. The response is sent to the appliance's current carrier-assigned IP address.
10. The Xerox SNMP Server response is routed to the carrier APN.
11. The carrier APN transmits the Xerox SNMP Server response to the appliance over the cellular network using the existing PPP/GPRS session, with the Xerox SNMP Server IP address as the source address and the appliance's assigned IP address as the destination address.
12. The appliance receives the Xerox SNMP Server response over the PPP/GPRS session on the cellular network.
13. The appliance redirects the Xerox SNMP Server response and sends it over its Ethernet connection to the printer. It uses the printer IP address as the destination address (performing address translation from its carrier-assigned IP address) and the Xerox SNMP Server IP address as the source address.
14. The appliance's PPP/GPRS session with the carrier APN terminates in a standard manner.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for redirecting specific network traffic between a first data network and a target device, the method comprising:
  inserting a redirector into the first network, the first network comprising an Ethernet network, in front of the target device by inserting a network cable for the target device into a first network interface on the redirector and connecting the target device to second network interface on the redirector, wherein the redirector is also connected by a third network interface to a second data network;
  setting an initial network address of the redirector device to all zeros;
  intercepting, at the redirector, an initial transmission from the target device, thereby allowing the redirector to determine the network addresses of the target device;
  configuring the redirector to use the network addresses of the target device in place of the initial network address and to use the network address of the target device at a port of the redirector connected to the target device with a Locally-Administered Address bit set to on;
  inspecting the network traffic on the first network to identify a specific type of network traffic according to a higher level protocol in the network traffic; and
  sending, using the redirector, the network traffic associated with the specific type of network traffic to the second network.

2. The method of claim 1 wherein the network traffic is also sent to an original destination on the first network.

3. A method for redirecting specific network traffic between a first data network and a target device, the method comprising:
  inserting a redirector into the first network in front of the target device by inserting a network cable for the target device into a first network interface on the redirector and connecting the target device to second network interface on the redirector, wherein the redirector is also connected by a third network interface to a second data network;
  setting an initial network address of the redirector device to all zeros;
  intercepting, at the redirector, an initial transmission from the target device, thereby allowing the redirector to determine the network addresses of the target device;
  configuring the redirector to use the network addresses of the target device in place of the initial network address and to use the network address of the target device at a port of the redirector connected to the target device with a Locally-Administered Address bit set to on;
  inspecting the network traffic on the first network to identify a specific type of network traffic according to a higher level protocol in the network traffic; and
  sending, using the redirector, the network traffic associated with the specific type of network traffic to the second network, the second network comprising a cellular network.

4. The method of claim 3 wherein the network traffic is also sent to an original destination on the first network.

* * * * *